US012364184B2

(12) United States Patent
Garner et al.

(10) Patent No.: US 12,364,184 B2
(45) Date of Patent: Jul. 22, 2025

(54) KICKOUT WHEEL ASSEMBLY FOR A SEED METER

(71) Applicant: DEERE & COMPANY, Moline, IL (US)

(72) Inventors: Elijah B. Garner, Bettendorf, IA (US); Beth A. Wolfs, Tiffin, IA (US); Jerry Samuelson, Woodhull, IL (US)

(73) Assignee: DEERE & COMPANY, Moline, IL (US)

( * ) Notice: Subject to any disclaimer, the term of this patent is extended or adjusted under 35 U.S.C. 154(b) by 570 days.

(21) Appl. No.: 17/718,105

(22) Filed: Apr. 11, 2022

(65) Prior Publication Data

US 2022/0232756 A1   Jul. 28, 2022

Related U.S. Application Data (62) Division of application No. 16/409,418, filed on May 10, 2019, now Pat. No. 11,297,761.

(51) Int. Cl.
| | |
|---|---|
| *A01C 7/04* | (2006.01) |
| *A01C 7/08* | (2006.01) |
| *A01C 7/10* | (2006.01) |
| *A01C 7/14* | (2006.01) |
| *B65G 65/48* | (2006.01) |

(52) U.S. Cl.
CPC ............ *A01C 7/046* (2013.01); *A01C 7/0443* (2023.05); *A01C 7/0445* (2023.05); *A01C 7/082* (2013.01); *A01C 7/102* (2013.01); *A01C 7/14* (2013.01); *B65G 65/4881* (2013.01)

(58) Field of Classification Search
CPC ......... A01C 7/046; A01C 7/044; A01C 7/042; A01C 7/04; A01C 7/00; A01C 7/0445; A01C 7/0443; A01C 7/082; A01C 7/102; A01C 7/14; A01C 7/081; A01C 7/08; A01C 7/10; A01C 7/12; B65G 65/4881; B65G 65/48; B65G 65/40; B65G 65/34; B65G 65/30; B65G 65/00
See application file for complete search history.

(56) References Cited

U.S. PATENT DOCUMENTS

| | | | |
|---|---|---|---|
| 4,515,291 A | 5/1985 | Holmes | |
| 4,600,122 A | 7/1986 | Undie et al. | |
| 4,613,056 A | 9/1986 | Olson | |

(Continued)

FOREIGN PATENT DOCUMENTS

| | | |
|---|---|---|
| BE | 480800 A | 3/1948 |
| DE | 102009043881 A1 | 3/2011 |

(Continued)

OTHER PUBLICATIONS

John Deere, "Planter Parts," parts guide publicly available at least as early as Jan. 22, 2021 (27 pages).

(Continued)

*Primary Examiner* — Christopher J. Novosad
(74) *Attorney, Agent, or Firm* — Michael Best & Friedrich LLP (57) ABSTRACT

A kickout wheel assembly for removing seeds from a seed metering member. The kickout wheel assembly includes a first kickout wheel configured to rotate to remove seeds from the seed metering member, and a second kickout wheel configured to rotate to remove seeds from the seed metering member. The second kickout wheel is journaled independently from the first kickout wheel.

20 Claims, 10 Drawing Sheets

(56) References Cited

U.S. PATENT DOCUMENTS

2013/0192504 A1    8/2013   Sauder et al.
2016/0338261 A1   11/2016   Hak et al.

FOREIGN PATENT DOCUMENTS

| EP | 0140701 A2 | 5/1985 |
| EP | 0155688 A2 | 9/1985 |
| SU | 1753979 A | 8/1992 |

OTHER PUBLICATIONS

John Deere, "1770NT CCS 16-Row Narrow Planter with MaxEmerge Plus Row Units," Operators Manual © 2002 (456 pages).
John Deere, "2100 Series Planters (Up to Serial No. -099999)," Operator's Manual © 2020 (202 pages).
John Deere, "MP25 Gen II Unit Planter (Mexico Edition)," Operator's Manual, Issue F8 © 2018 (56 pages).
Extended European Search Report for Application No. 20173577.6 dated Sep. 17, 2020 (10 pages).

KICKOUT WHEEL ASSEMBLY FOR A SEED METER

CROSS-REFERENCE TO RELATED APPLICATION

This application is a divisional of U.S. patent application Ser. No. 16/409,418 filed on May 10, 2019, the entire contents of which are incorporated herein by reference.

BACKGROUND

The present disclosure relates to a seeding machine for metering seeds to be planted, such as a row crop planter for agricultural applications. More specifically, the present disclosure relates to a seed meter assembly having a metering member, such as a seed disk, for singulating small grains such as wheat, barley, rice, oats, etc.

SUMMARY

The disclosure provides a seed meter assembly including a metering member configured for improving the speed with which the metering member can pick up certain small grains such as wheat and other similarly shaped seeds (barley, rice, oats, etc.). Growers often plant wheat at relatively high rates such as a 1,000,000 seeds per acre compared with lower rates of 200,000 seeds per acre for soybeans or 36,000 seeds per acre for corn. The speed at which the metering member can adhere seeds as it passes through a seed pool depends at least in part on the direction of rotation of the metering member relative to the geometry of the metering member, which may include apertures and cells of a certain shape surrounding each aperture. This speed can be expressed as surface-feet-per-second (SFPS), i.e., the number of linear feet that a location on the rotating metering member travels in one second. There are a number of variables that contribute to increasing this effective SFPS, such as distance between apertures, the number of rows of apertures (each of which contributes individually to the effective, or overall, SFPS), the number of apertures in each row, sources of agitation in the seed pool, and the geometry of the metering member in the vicinity of the apertures (e.g., cell shape).

In one aspect, the disclosure provides a kickout wheel assembly for a seed meter having a metering member, the metering member including a first circumferential array of apertures for picking up seeds from a seed reservoir under the influence of a pressure differential, and a second circumferential array of apertures for picking up seeds from the seed reservoir under the influence of the pressure differential, the metering member being rotatable about a rotation axis at a metering member speed, the first circumferential array of apertures being disposed at a first radial distance from the rotation axis and the second circumferential array of apertures being disposed at a second radial distance from the rotation axis, the second radial distance being different than the first radial distance. The kickout wheel assembly includes a first kickout wheel and a second kickout wheel. The first kickout wheel is configured to remove seeds from the first circumferential array of apertures. The first kickout wheel is configured to be driven by the metering member at a first kickout wheel rotational speed that is proportional to the metering member speed. The second kickout wheel is configured to remove seeds from the second circumferential array of apertures. The second kickout wheel is configured to be driven by the metering member at a second kickout wheel rotational speed that is proportional to the metering member speed. The second kickout wheel rotational speed is different than the first kickout wheel rotational speed.

In another aspect, the disclosure provides a kickout wheel assembly for a seed meter having a metering member including a first circumferential array of apertures for picking up seeds from a seed reservoir under the influence of a pressure differential, and a second circumferential array of apertures for picking up seeds from the seed reservoir under the influence of the pressure differential. The kickout wheel assembly includes a first kickout wheel and a second kickout wheel. The first kickout wheel is configured to remove seeds from the first circumferential array of apertures. The first kickout wheel is journaled for rotation. The second kickout wheel is configured to remove seeds from the second circumferential array of apertures. The second kickout wheel is journaled for rotation independently from the first kickout wheel.

In yet another aspect, the disclosure provides a kickout wheel assembly for removing seeds from a seed metering member. The kickout wheel assembly includes a first kickout wheel configured to rotate to remove seeds from the seed metering member, and a second kickout wheel configured to rotate to remove seeds from the seed metering member. The second kickout wheel is journaled independently from the first kickout wheel.

In one aspect, the disclosure provides a seed meter assembly including a motor, a seed reservoir configured to support seeds, and a metering member having a seed side facing the seed reservoir and a non-seed side opposite the seed side. The motor is configured to drive the metering member in a rotational direction moving from upstream towards downstream. The metering member includes a plurality of apertures extending from the seed side to the non-seed side for picking up seeds from the seed reservoir under the influence of a pressure differential, and a cell diverging from an aperture of the plurality of apertures towards the seed side to define a surface recessed therefrom, the cell configured to receive one of the seeds, the cell being elongated between a first end defining a furthest extent of the cell in an upstream direction and a second end defining a furthest extent of the cell in a downstream direction. The aperture of the plurality of apertures is disposed closer to the second end than to the first end.

In another aspect, the cell has a semi-circular outline combined with a semi-oval or semi-elliptical outline.

In another aspect, the semi-circular outline is disposed generally around a first half of the aperture and the semi-oval or semi-elliptical outline is disposed generally around a second half of the aperture.

In another aspect, the surface curvedly extends from the first end to the aperture and curvedly extends from the aperture to the second end.

In another aspect, the surface includes a steeper recessing slope adjacent the first and second ends than adjacent the aperture.

In another aspect, the seed metering includes at least one brush disposed adjacent the seed side of the metering member and configured to sweep across the cell from the second end to the first end as the metering member rotates.

In another aspect, the at least one brush includes a brush disposed proximate an upper boundary of the seed reservoir.

In another aspect, the at least one brush includes a brush disposed above the seed reservoir configured to return excess seeds to the seed reservoir by agitation and gravity.

In another aspect, the metering member is operable to transport at least 70 seeds per second from the seed pool to a delivery conduit extending from the metering member towards the ground.

In another aspect, the metering member is operable to transport 200 or more seeds per second from the seed pool to a delivery conduit extending from the metering member towards the ground.

In another aspect, the metering member is operable to transport 590 to 670 seeds per second from the seed pool to a delivery conduit extending from the metering member towards the ground.

In another aspect, the metering member is operable to transport 610 to 650 seeds per second from the seed pool to a delivery conduit extending from the metering member towards the ground.

In another aspect, the plurality of apertures includes a plurality of rows of apertures.

In another aspect, the cell is shaped to receive wheat.

In yet another aspect, the disclosure provides a seed metering member rotatable about an axis in a rotational direction moving from upstream towards downstream. The seed metering member includes a seed side configured to face a seed reservoir and a non-seed side opposite the seed side, a plurality of apertures for picking up seeds under the influence of a pressure differential, and a plurality of cells, each cell diverging from one aperture of the plurality of apertures towards the seed side to define a surface recessed from the seed side. Each cell is configured to receive one of the seeds, each cell further being elongated between a first end defining a furthest extent of the cell in an upstream direction and a second end defining a furthest extent of the cell in a downstream direction. The one aperture is disposed closer to the second end than to the first end. Each cell includes a recessed surface curvedly extending from the first end to the one aperture and curvedly extending from the one aperture to the second end.

In another aspect, the cell has a semi-circular outline combined with a semi-oval or semi-elliptical outline, wherein the semi-circular outline is disposed generally around a first half of the aperture and the semi-oval or semi-elliptical outline is disposed generally around a second half of the aperture.

In yet another aspect, the disclosure provides a seed meter assembly including a motor, a seed reservoir configured to support seeds, and a metering member having a seed side facing the seed reservoir and a non-seed side opposite the seed side. The motor is configured to drive the metering member in a rotational direction. The metering member includes a plurality of rows of apertures for picking up seeds from the seed reservoir under the influence of a pressure differential. The seed meter assembly also includes a kickout wheel assembly disposed on the non-seed side of the metering member for clearing the plurality of rows of apertures. The kickout wheel assembly includes a plurality of kickout wheels independently journaled for rotation, each kickout wheel of the plurality of kickout wheels having projections configured to mesh with a respective one row of the plurality of rows of apertures and to rotate at different speeds as the metering member rotates.

In another aspect, each kickout wheel of the plurality of kickout wheels has a different diameter and a different number of projections.

In another aspect, the number of apertures in each row of the plurality of rows of apertures is different, and wherein the number of projections on each kickout wheel of the plurality of kickout wheels is different.

In another aspect, the number of apertures in each row of the plurality of rows of apertures increases as the plurality of rows extends radially outwards on the metering member, and wherein the number of projections on each kickout wheel of the plurality of kickout wheels increases as the kickout wheels extend radially outwards with respect to the metering member.

Any of the above referenced aspects of the disclosure can be combined with any one or more of the above referenced aspects of the disclosure.

In addition, other aspects of the disclosure will become apparent by consideration of the detailed description and accompanying drawings.

DETAILED DESCRIPTION

Before any embodiments of the disclosure are explained in detail, it is to be understood that the disclosure is not limited in its application to the details of construction and the arrangement of components set forth in the following description or illustrated in the following drawings. The disclosure is capable of supporting other embodiments and of being practiced or of being carried out in various ways.

Figure 1:
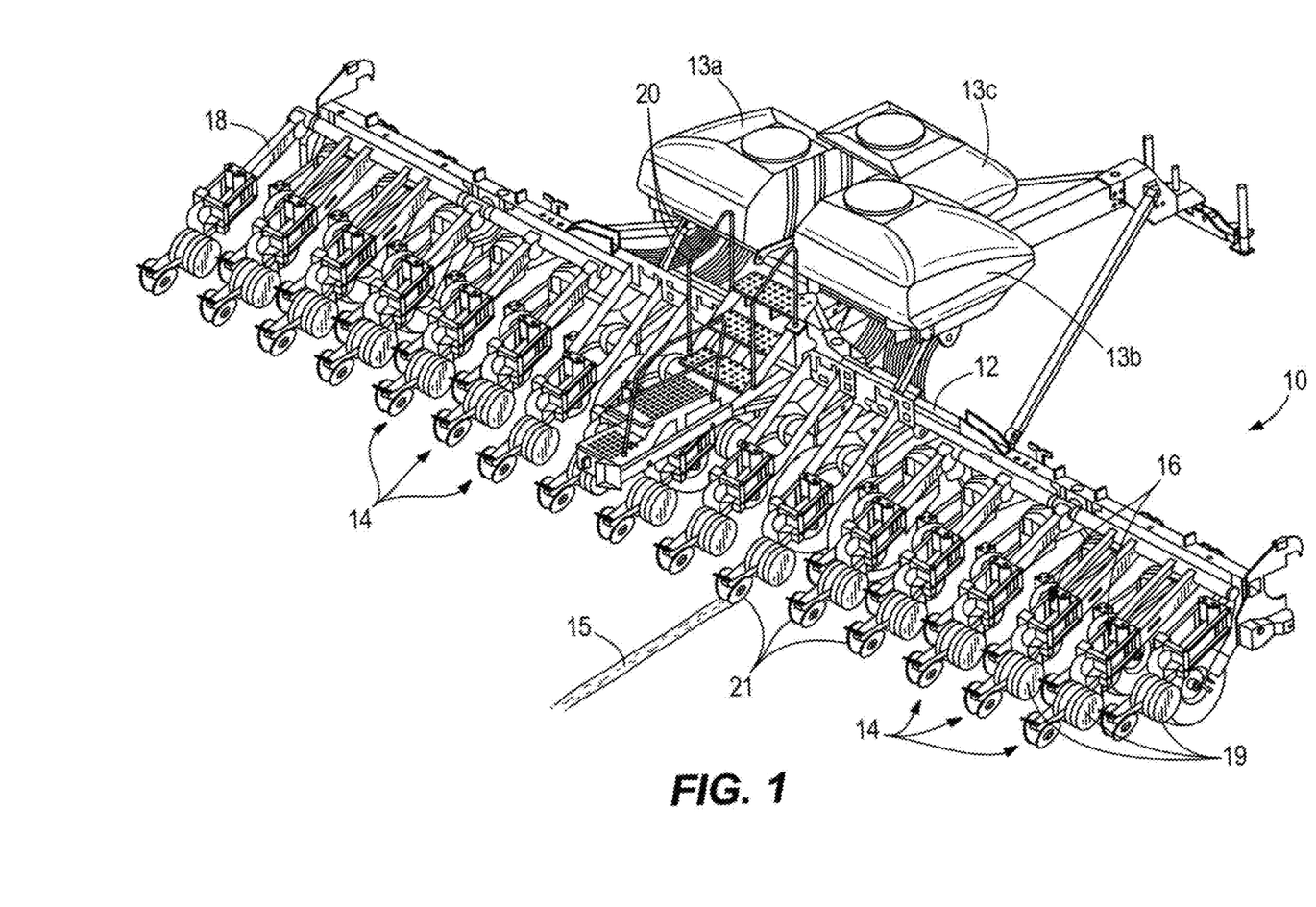
FIG. 1 is a perspective view of a seeding machine.
Figure 2:
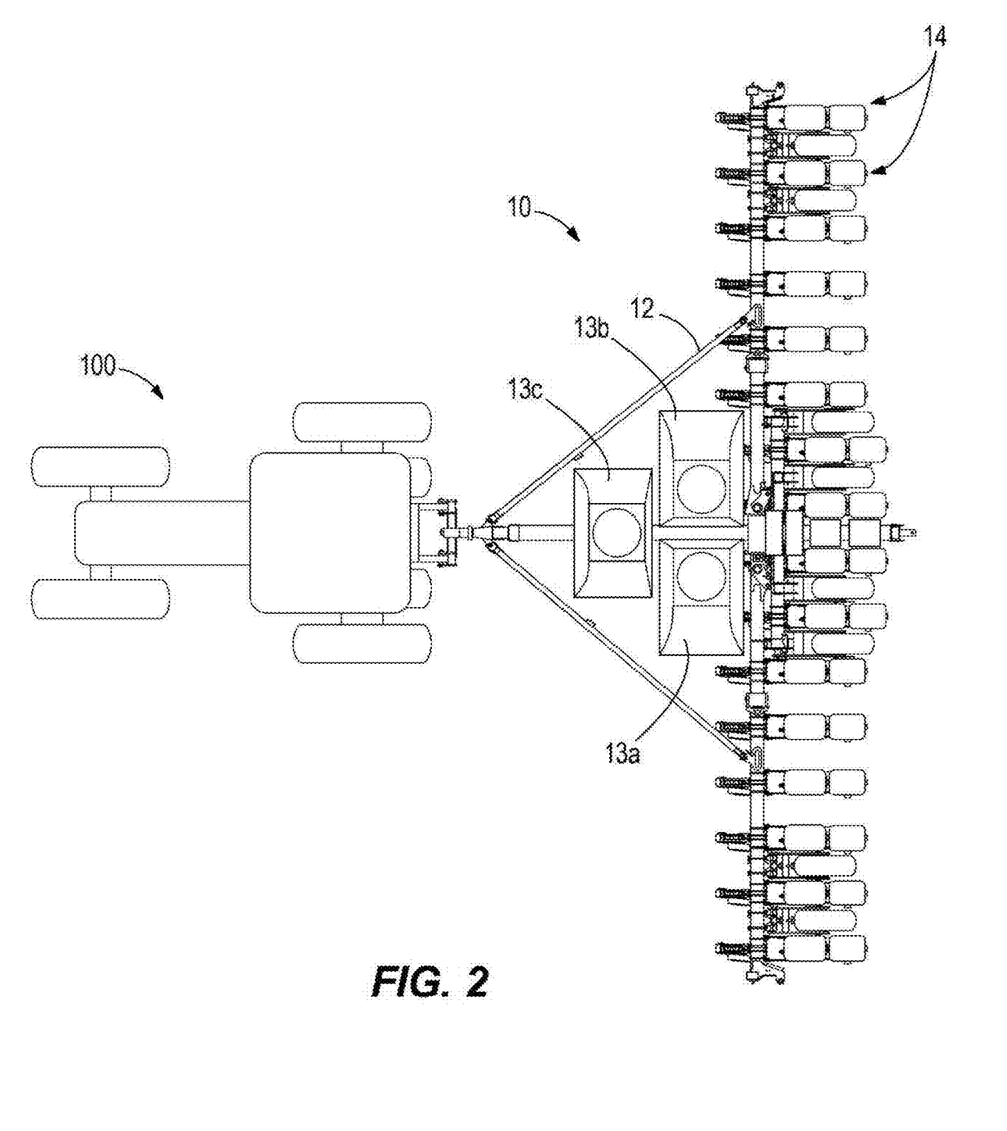
FIG. 2 is a top view of the seeding machine of FIG. 1 coupled to a towing vehicle.

FIGS. 1-2 illustrate a seeding machine 10, such as a row crop planter pulled by a vehicle 100, such as a tractor (FIG. 2). The seeding machine 10 has a frame 12 on which are mounted a plurality of individual row units 14. Seed sources, such as storage tanks 13a-13c, hold seed that may be delivered, e.g., pneumatically, to a mini-hopper on each row unit 14 or directly to each row unit 14. The storage tanks 13a-13c may be coupled to the row units 14 by way of conduits 20, such as hoses, and a pressurized delivery apparatus (not shown). Each storage tank 13a-13c can be used to contain the same variety of seeds, or a different variety of seeds. For example, a first storage tank 13a may contain a first variety of seeds, a second storage tank 13b may contain a second variety of seeds, and a third storage tank 13c may contain a third variety of seeds. In other implementations, the storage tanks 13a-13c may contain the same variety of seeds, and need only employ a single storage tank. In other implementations, one, two, four, or more storage tanks may be employed. The varieties of seed may include small seeds or grains, such as wheat, barley, rice, oats, etc., or other small seeds or grains of a similar size. In other implementations, larger seeds of a similar shape may be employed.

Each row unit 14 has a frame 18 to which the components of the row unit 14 are mounted. For example, the frame 18 may carry furrow opening disks 21 for forming a furrow 15 with an open channel in the soil beneath the seeding machine 10 into which seed is deposited, as well as closing wheels (not shown) to close the furrow over the deposited seed in the furrow 15.

Figure 3:
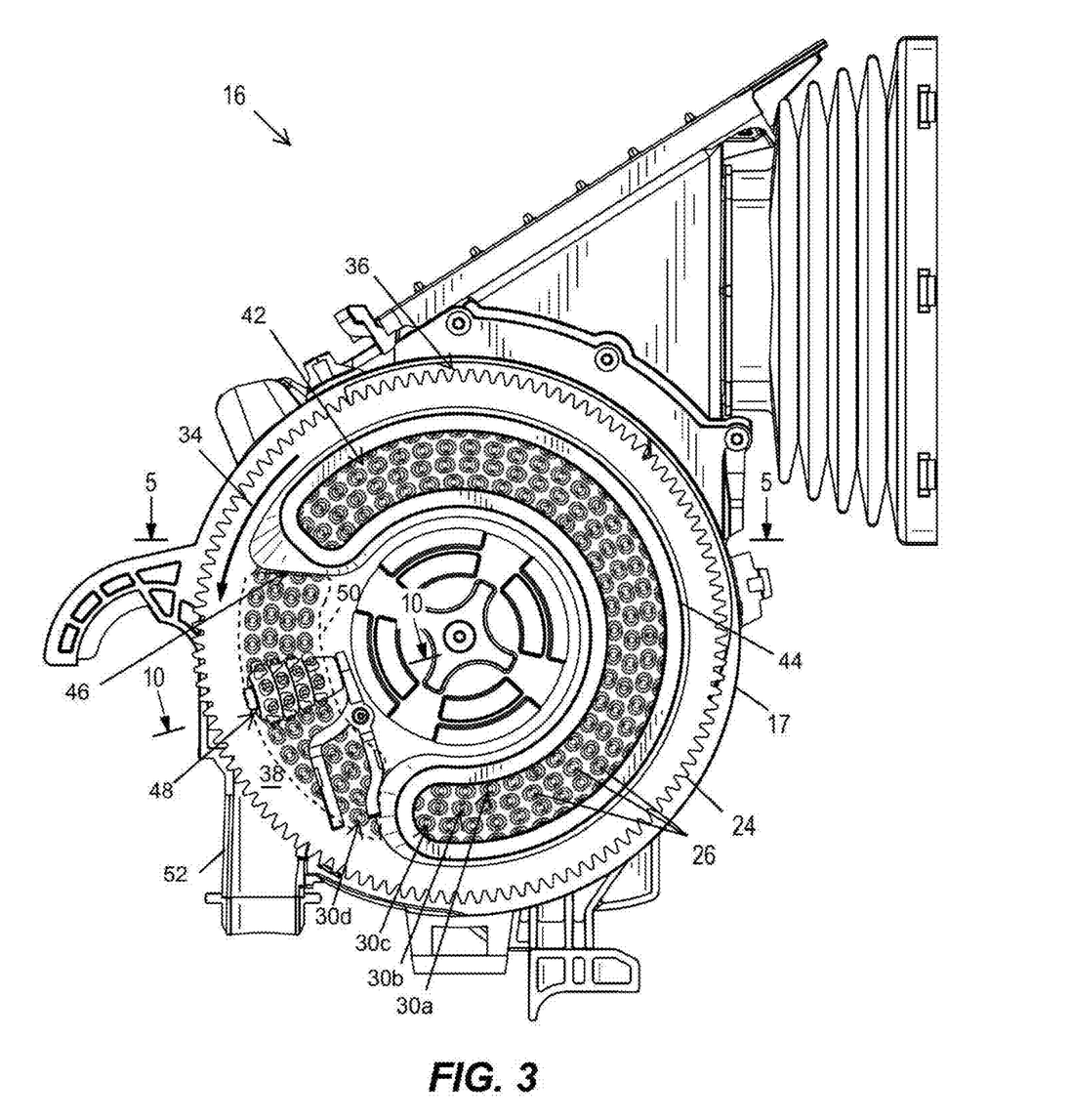
FIG. 3 is a right side view of a portion of a seed meter assembly and a seed tube for the seeding machine of FIG. 1.

As illustrated in FIG. 3, a seed meter assembly 16 having a housing 17 and a seed metering member 24 is coupled to each row unit frame 18. The seed metering assembly 16 is coupled to one or more of the storage tanks 13a-13c by way of the conduits 20. The metering member 24 takes seeds from a seed reservoir 28 supporting a seed pool 22 (FIG. 4) and sequentially discharges single seeds S (metered seeds) for delivery one at a time (e.g., singulates and meters the seeds). The metering member 24 employs a negative air pressure differential (i.e., a vacuum), as will be described in greater detail herein, to adhere seeds to the metering member 24, which can be in the form of a disk (as illustrated), or more generally a plate, a bowl, an internal drum meter, an external drum meter, etc., having apertures 26 that extend therethrough. The apertures 26 are generally arranged circumferentially about a meter axis A, substantially in a circle, proximate an outer edge of the metering member 24. The apertures 26 are arranged in a plurality of rows 30a-30d arranged concentrically about the meter axis A. In the illustrated implementation, the plurality of rows includes a first row 30a, a second row 30b, a third row 30c, and a fourth row 30d. However, in other implementations, the plurality of rows 30a-30d may include only one row, only two rows, only three rows, five rows, or more rows. Preferably, the metering member 24 includes at least four rows 30a-30d in order to sufficiently increase the effective SFPS. In the illustrated implementation, each row of the plurality of rows 30a-30d includes a different number of apertures 26. For example, the number of apertures 26 in each row 30a-30d increases as the rows increase in radial distance from the meter axis A. The apertures 26 are arranged close together in each row 30a-30d in order to increase the effective SFPS. In other implementations, the rows 30a-30d of apertures 26 may be arranged coaxially on a drum-style metering member.

Figure 5:
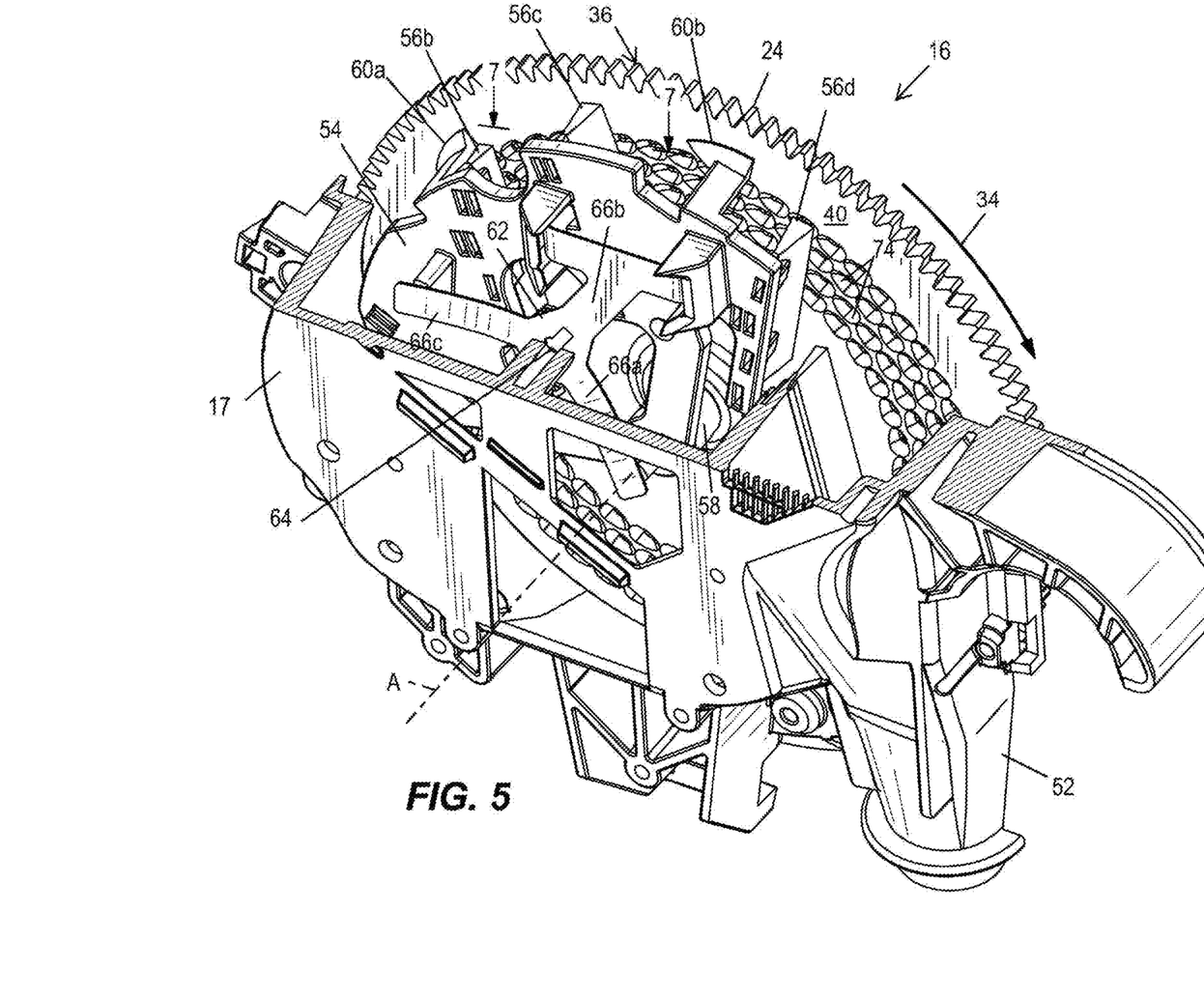
FIG. 5 is a left side perspective view of a portion of the seed meter assembly shown in FIG. 4 with a portion of the left side housing removed.
Figure 6:
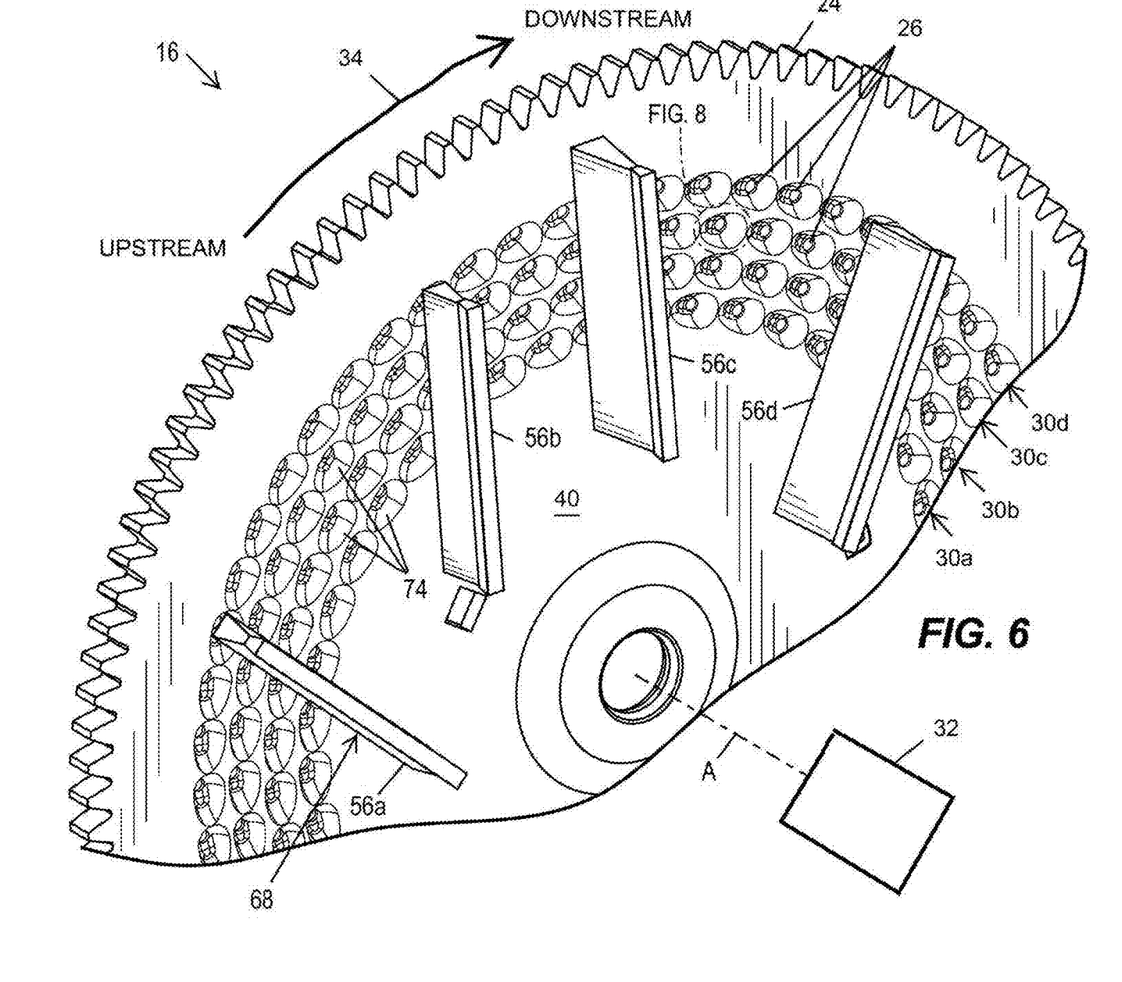
FIG. 6 is a left side perspective view of the metering member with brushes.

The metering member 24 may be driven to rotate by a motor 32 (illustrated schematically in FIG. 6), such as an electric motor. The motor 32 may include any other suitable drive mechanism, such as a transverse hex shaft driven by a ground wheel or electric or hydraulic motor and coupled to individual meters by chains or drive cables, etc. The motor 32 drives the metering member 24 to rotate in a rotational direction 34, as illustrated by the arrow in FIGS. 3-11. The rotational direction 34 is defined by the shortest rotational distance from a top 36 of the metering member 24, opposite the seed reservoir 28, towards the delivery conduit 52, which will be described in greater detail below. In the illustrated implementation, the metering member 24 is driven counter-clockwise when viewing a non-seed side 38 (FIG. 3) and clockwise when viewing a seed side 40 (FIG. 5). The motor 32 rotates the metering member 24 at a speed that corresponds with transport of 30 or more seeds per second to the furrow 15 (e.g., 30 to 700 seeds per second), which may be referred to herein as a singulation rate of the seed meter assembly 16, or of the metering member 24. More specifically, the singulation rate may be 70 or more seeds per second, and even more specifically may be 200 or more seeds per second. Even more specifically, the singulation rate is 200 to 700 seeds per second. For example, the singulation rate may be 300 to 700 seeds per second, 400 to 700 seeds per second, 500 to 700 seeds per second, or 600 to 700 seeds per second. Even more specifically, the singulation rate may be 590 to 670 seeds per second. Even more specifically still, the singulation rate may be 610 to 650 seeds per second. These singulation rates are higher than typical singulation rates of metering members designed for other types of seed, such as corn, beans, and soy. Both speed of the metering member and the number of apertures in the metering member contribute to the singulation rate, with higher speeds and higher number of apertures promoting higher singulation rates.

Figure 4:
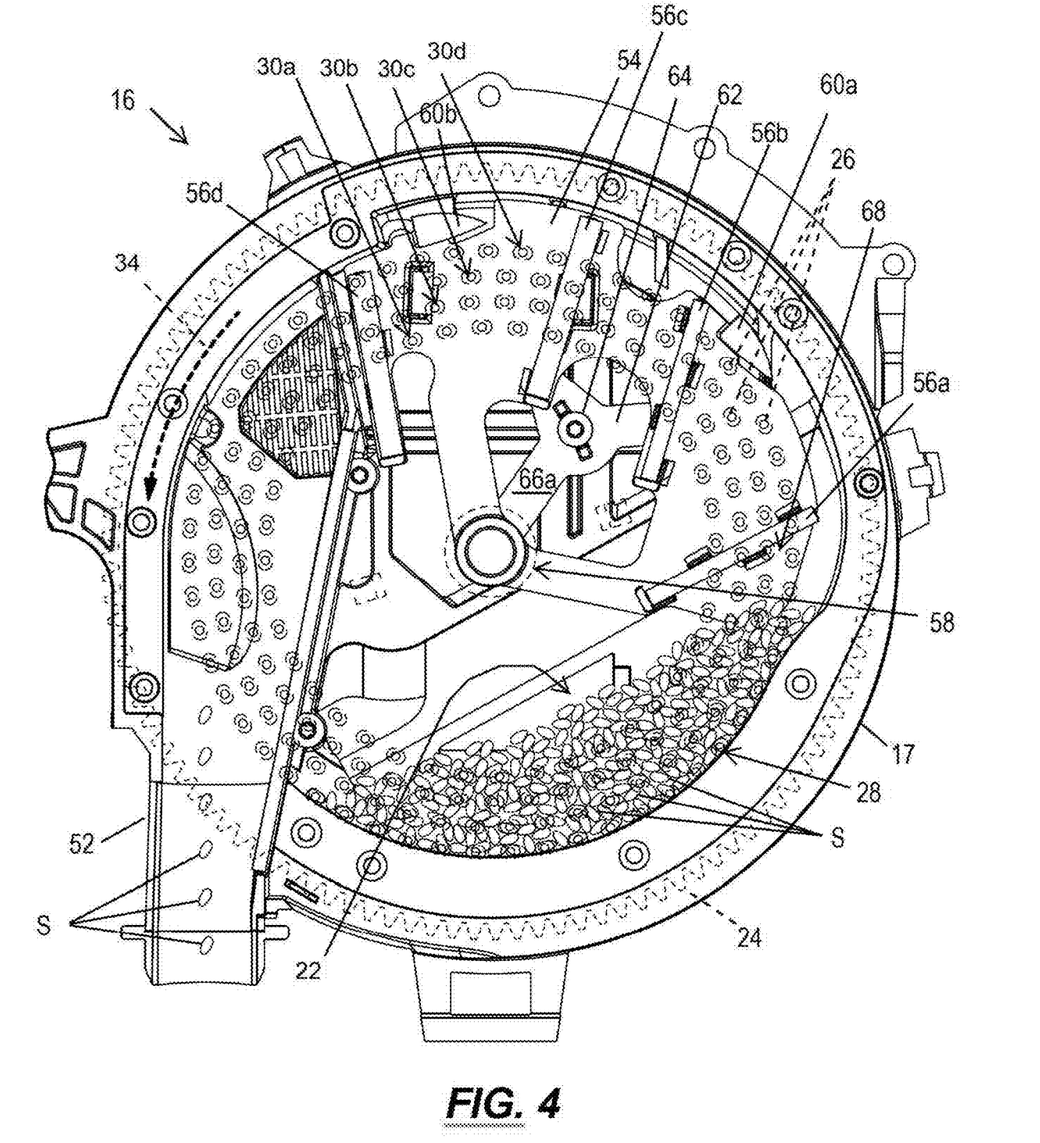
FIG. 4 is a right side view of a portion of the seed meter assembly shown in FIG. 3 with the right side housing removed.

With reference to FIGS. 4-5, the seed reservoir 28 containing the seed pool 22 is disposed on the seed side 40 of the metering member 24 at a lower portion thereof, and is connected to one or more of the storage tanks 13a-13c to receive seeds therefrom by way of the conduits 20. Thus, the seed side 40 faces the seed reservoir 28. A pressure differential is applied across the metering member 24 from the seed side 40 of the metering member 24 to the non-seed side 38 (FIG. 3) of the metering member 24, through the apertures 26. The pressure differential may be applied by a pump (not shown), as is understood in the art. In the illustrated implementation, a negative pressure, or vacuum applied on the non-seed side 40 provides a suction force that adheres a seed S to the seed side 40 of the metering member 24 at the apertures 26. The pressure differential is applied in a vacuum zone 42 defined by a vacuum-seal housing 44 illustrated in FIG. 3 across a portion of the metering member 24, and thus across some, but not all of the apertures 26. The vacuum zone 42 is defined by the vacuum-seal housing 44 that engages the non-seed side 38 of the metering member 24. In the illustrated implementations, the pressure differential draws seeds into adherence with the seed side 40 of the metering member 24. In order to release a seed S, one seed at a time (e.g., to meter, or singulate, the seeds), the vacuum is terminated at a desired release position in an area referred to herein as a vacuum cutoff 46. The vacuum cutoff 46 is a region disposed immediately adjacent the vacuum-seal housing 44 in a circumferential direction with respect to the meter axis A and is not under the influence of the pressure differential. Mechanical assistance, such as a kickout wheel assembly 48 (as will be described in greater detail), is utilized to clear (e.g., to push) the seed off the metering member 24. The kickout wheel assembly 48 described herein may be disposed outside of the vacuum zone 42, e.g., in a non-vacuum zone 50. In yet other implementations, other types of metering members 24 for metering/singulating the seeds may be employed. In further implementations, rather than applying a vacuum to the non-seed side 38 of the metering member 24, a positive pressure may be applied to the seed side 40 to adhere the seeds S to the metering member 24. It should be understood that positive and negative are relative terms. As such, the terms "positive pressure" and "negative pressure" are meant to describe relative pressures of a pressure differential. For example, a positive pressure is one that is higher than its surroundings (e.g., higher than atmospheric pressure or than another pressure in the seeding machine 10), and a negative pressure is one that is lower than its surroundings (e.g., lower than atmospheric pressure or than another pressure in the seeding machine 10).

With reference to FIGS. 3-4, a delivery conduit 52, or tube, is disposed in the non-vacuum zone 50 for receiving singulated, metered seeds S from the metering member 24. The delivery conduit 52 may be configured to direct singulated, metered seeds S from the metering member 24 to the furrow 15 by gravity. In other implementations, the delivery conduit 52 may be operatively coupled to a source of air pressure, such as a pump (not shown), for directing the singulated, metered seeds S to the furrow 15 by pressure differential.

With reference to FIGS. 4-7, a bracket 54 disposed on the seed side 40 of the metering member 24 fixedly supports a plurality of brushes 56a-56d extending into engagement with the seed side 40 of the metering member 24. The bracket 54 is mounted fixedly, e.g., proximate the metering axis A, such that the metering member 24 rotates relative to the bracket 54 and the bracket 54 remains stationary. The bracket 54 may include a hub 58 concentric with the metering axis A, which may include a bearing or a bearing surface, about which the metering member 24 rotates. The bracket 54 includes one or more feet 60a-60c that brace the bracket 54 against the seed side 40 of the movable metering member 24. In the illustrated implementation, the bracket 54 includes a first foot 60a and a second foot 60b in engagement with the metering member 24, e.g., by respective bearing surfaces, though other quantities of feet may be employed in other implementations. The bracket 54 is spring-loaded into engagement with the metering member 24 by way of a biasing member 62 on the seed side. The biasing member 62 is fixedly mounted to the housing 17 at a mounting point 64, e.g., by a fastener, such that the biasing member 62 is placed in compression between the housing 17 and the bracket 54. The biasing member 62 is formed as a plate, e.g., from a sheet of material such as metal or other suitable material, and includes a plurality of arms 66a-66c extending away from the mounting point 64, e.g., in radial directions. In the illustrated implementation, the biasing member 62 includes a first arm 66a, a second arm 66b, and a third arm 66c, but may include a single arm, two arms, or more than three arms in other implementations. The first arm 66a is coupled to the bracket 54 proximate the hub 58, and the second and third arms 66b, 66c are coupled to the bracket 54 at different locations about the hub 58. The plurality of arms 66a-66c are mounted in flexion by the compression arrangement described above. Thus, the bracket 54 and the plurality of brushes 56a-56d carried by the bracket 54 are spring-loaded into engagement with the seed side 40 of the metering member 24 by the biasing member 62.

In the illustrated implementation, the plurality of brushes 56a-56d includes a first brush 56a, a second brush 56b, a third brush 56c, and a fourth brush 56d. The plurality of brushes 56a-56d each extends across all of the rows 30a-30d of apertures 26. The first brush 56a is disposed at, or defines, a top of the seed pool 22 proximate an upper boundary 68 of the seed reservoir 28. The fourth brush 56d is disposed adjacent the delivery conduit 52. The second and third brushes 56b, 56c are disposed between the first and fourth brushes 56a, 56d and above the seed pool 22 (i.e., above the seed reservoir 28) with respect to a gravitational direction (vertical in all drawings). Each of the brushes 56a-56d includes a brush member 70 (FIG. 7), such as a plurality of bristles, extending from a brush base 72, the brush member 70 extending into engagement with the seed side 40 of the metering member 24. In other implementations, each brush member 70 may also or alternatively include a single brush block, such as a foam block, or other block of flexible material, extending from the brush base 72 and into engagement with the seed side 40 of the metering member 24. In yet other implementations, each brush member 70 may include a wiper, such as a rubber wiper, or other suitable material. Thus, the brush member 70 may be formed from a flexible material. Other suitable types of brush members 70 may be employed.

With reference to FIGS. 6-9, each aperture 26 is fluidly coupled to, and surrounded by, a cell 74 diverging therefrom toward the seed side 40 to define a surface 90 (FIGS. 8-9) recessed from the seed side with the aperture 26 through the recessed surface 90. Thus, the cells 74 are recessed from the seed side 40 of the metering member 24 towards the non-seed side 38. At least one of the apertures 26 is surrounded by the cell 74 diverging therefrom, and in the illustrated implementation all of the apertures 26 are surrounded by a respective one of the cells 74. In the illustrated implementation, each cell 74 is substantially identical in shape and size to the next, such that the shape and size of only one of the cells 74 need be described. With particular reference to the orthogonal view of the cell 74 in FIG. 9, the cell 74 includes an elongated shape, elongated in the rotational direction 34 of the metering member 24. The elongated shape of the cell 74 extends between a first end 76 and a second end 78, the first end 76 being disposed upstream of the respective aperture 26 relative to the rotational direction 34, and the second end 78 being disposed downstream of the aperture 26 relative to the rotational direction 34. The first end 76 defines a furthest extent of the cell 74 in the upstream direction, and the second end 78 defines a furthest extent of the cell 74 in the downstream direction. The first end 76 is narrower than the second end 78 such that the shape of the cell 74 is tapered from the second end 78 towards the first end 76. In other words, the shape of the cell 74 is tapered in a direction opposite the rotational direction 34 of the metering member 24 (i.e., the upstream direction). Thus, the wider portion of the cell 74 (i.e., the second end 78) leads in the rotational direction 34. Furthermore, the aperture 26 is disposed closer to the second end 78 than to the first end 76 of the cell 74. Thus, the aperture 26 also leads in the rotational direction 34.

Figure 7:
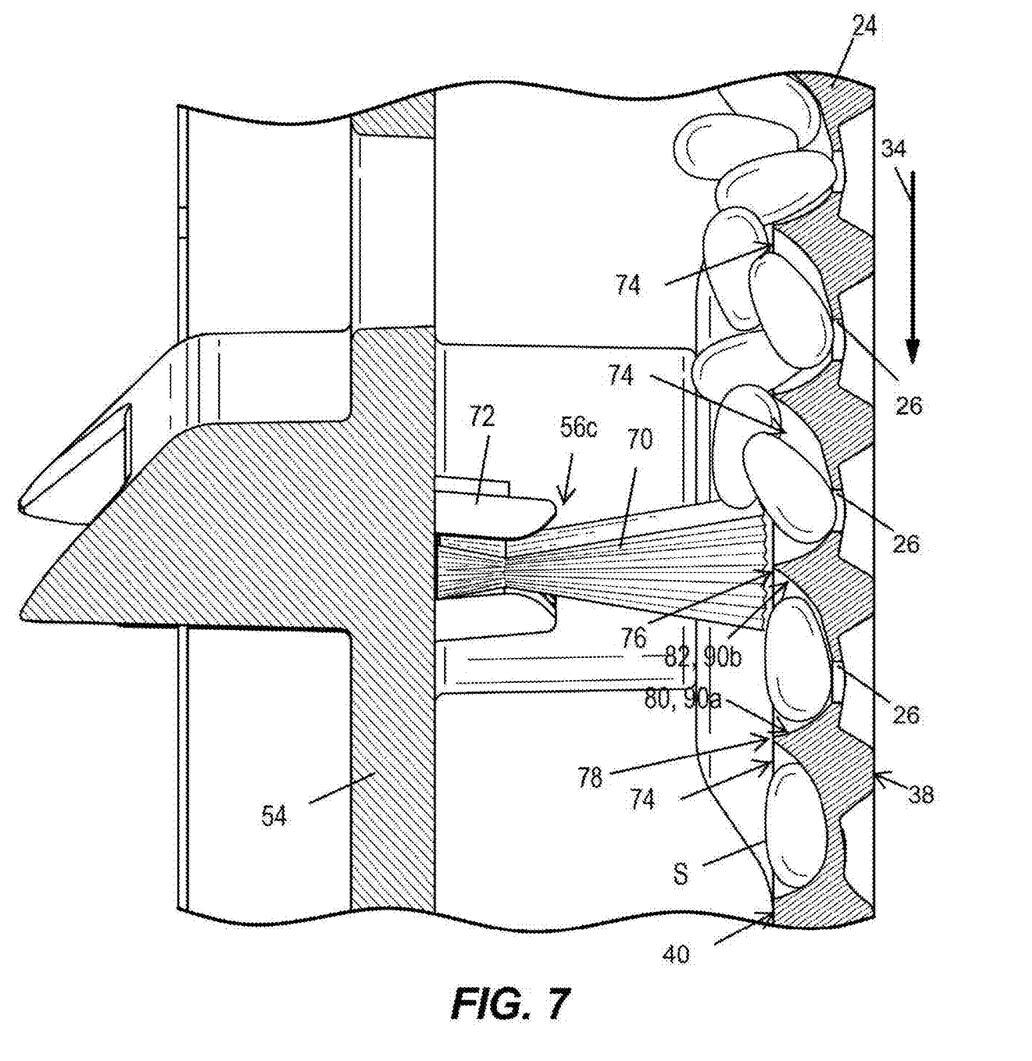
FIG. 7 is a cross-section of the seed meter assembly taken through line 7-7 in FIG. 5 with seeds.
Figure 8:
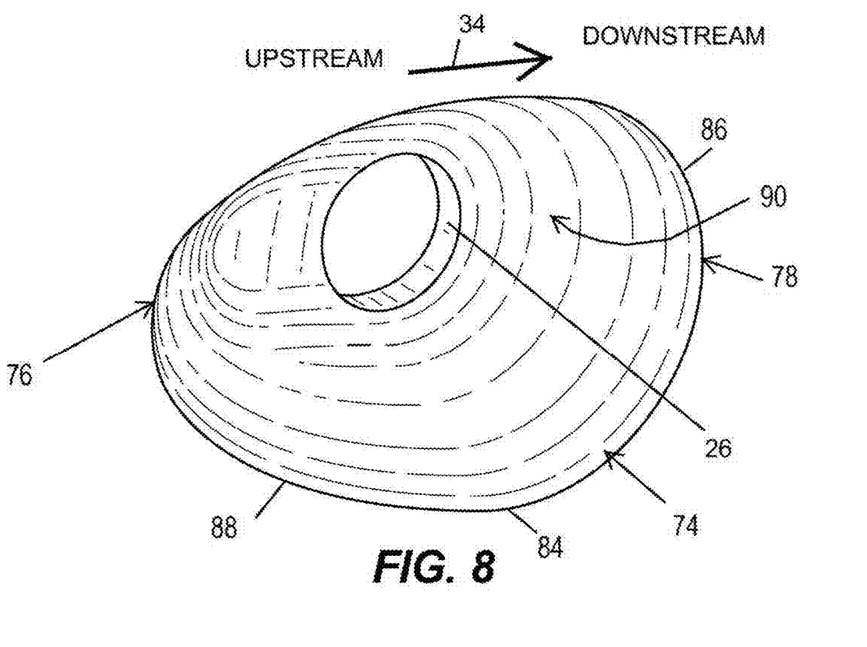
FIG. 8 is an enlarged view of a cell and aperture of the metering member of FIG. 6.
Figure 9:
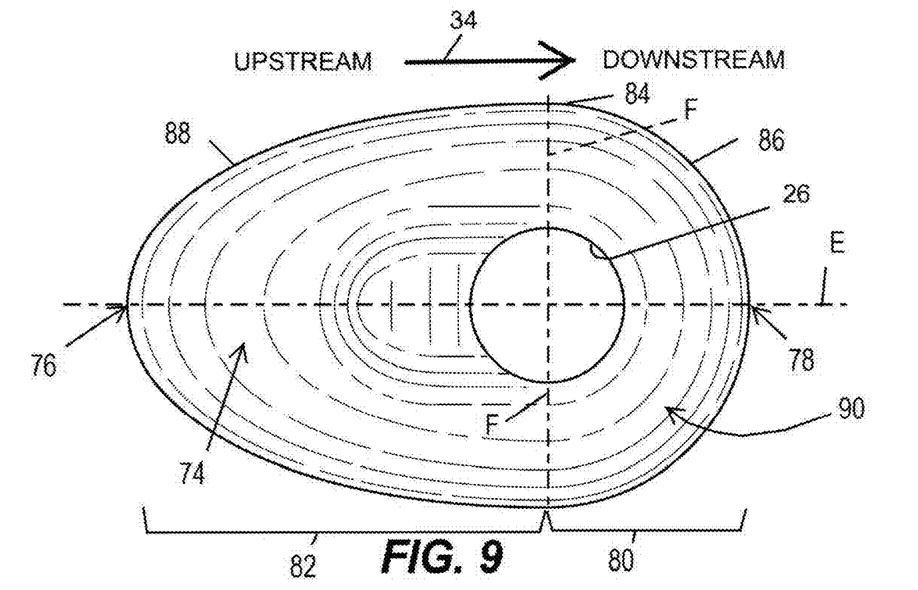
FIG. 9 is a front view of the cell and aperture of FIG. 8.

A leading portion 80 of the cell 74 proximate the second end 78 of the cell 74 may have a generally semi-circular recessed shape extending partially (e.g., about halfway or 180 degrees) around the aperture 26, while a trailing portion 82 of the cell 74 proximate the first end 76 of the cell 74 may have a generally tapered and/or elongated (e.g., generally semi-oval or semi-elliptical) recessed shape extending partially around (e.g., around the other half of) the aperture 26. More specifically, the cell 74 has an outline 84 defined by an intersection of the cell 74 with the seed side 40 of the metering member 24. The outline 84, or edge of the recessed cell 74 intersecting the seed side 40, generally includes the shape of a semi-circle 86 combined with a semi-oval or semi-ellipse 88. The terms "generally" and 'about" should be understood herein to mean approximately or nearly. The semi-circle 86 extends about halfway around the aperture 26 and the semi-oval or semi-ellipse 88 extends, in an elongated fashion with respect to the rotational direction 34, about halfway around the aperture 26 opposite the semi-circle 86. The cell 74 recesses away from the seed side 40 of the metering member 24 towards the non-seed side 38 of the metering member 24 in a bowl-like, or parabolic-like, shape as can be seen in the cross-section of FIG. 7. The bowl-like, or parabolic-like, shape is concave and has a slope (as can be seen in the cross-section of FIG. 7) that decreases in magnitude from the seed side 40 toward the non-seed side 38 and is zero (i.e., has a vertex) at its intersection with the aperture 26. In other words, the slope of the recessed surface 90 is steeper adjacent the seed side 40 than adjacent the aperture 26. Also apparent in the cross-section of FIG. 7 is the asymmetry of the cell shape discussed above, i.e., the bowl-like, or parabolic-like, shape is more elongated in the trailing portion 82 of the cell 74 than in the leading portion 80 of the cell 74. The cell 74 is deep (i.e., recessed) enough to cause seeds S to be scooped toward the aperture 26 at the vertex of each cell 74 but shallow enough that if there is more than one seed S attracted to each cell 74, the excess seeds are likely able to be perturbed away, e.g., by the brushes 56a-56d.

As illustrated in the cross section of FIG. 7, which is taken through the aperture 26 generally in a longitudinal direction E of elongation of the cell 74 (i.e., generally the rotational direction 34 of the metering member 24), the cell 74 includes the recessed surface 90 that is curved rather than flat. As shown, a trailing portion 90a of the recessed surface 90 curvedly extends in cross section from the first end 76 to the one of the plurality of apertures 26 and a leading portion 90b of the recessed surface 90 curvedly extends in cross section from the one of the plurality of apertures 26 to the second end 78. In a cross section (not shown) taken through the aperture 26 perpendicular to the cross-section shown in FIG. 7 (i.e., perpendicular to the rotational direction 34, or in a radial direction F with respect to the metering axis A), the recessed surface 90 is also entirely curved rather than flat or partially flat (as is illustrated by the shading in FIGS. 8-9).

As such, the cell 74 and aperture 26 are configured with respect to the rotational direction 34 to have a backsweeping geometry, i.e., for encouraging the seed S to lay down in the cell 74 as illustrated in FIG. 7 with a first portion of the seed S adhered to the aperture 26 by the pressure differential and received in the leading portion 80 proximate the second end 78 of the cell 74, and with a second portion of the seed S laid down and received in the elongated, tapered trailing portion 82 of the cell 74 proximate the first end 76. This "scoop" cell shape increases the number of seeds S that are brought close to each aperture 26 as it passes quickly through the seed pool 22 (as opposed to tear-drop-shaped cells having flat recessed surfaces employed, for example, with soybeans). The brushes 56a-56d singulate the seeds S by removing seeds in excess of one per cell 74 and encourage one seed S per cell 74 to lie down in the cell 74 as described herein. Given the rotational direction 34 of the metering member 24, the brushes 56a-56d sweep each cell 74 from the leading portion 80, including the wider second end 78, towards the trailing portion 82, including the narrower first end 76. The trailing portion 82 is longer in the rotational direction 34 than the leading portion 80.

Figure 10:
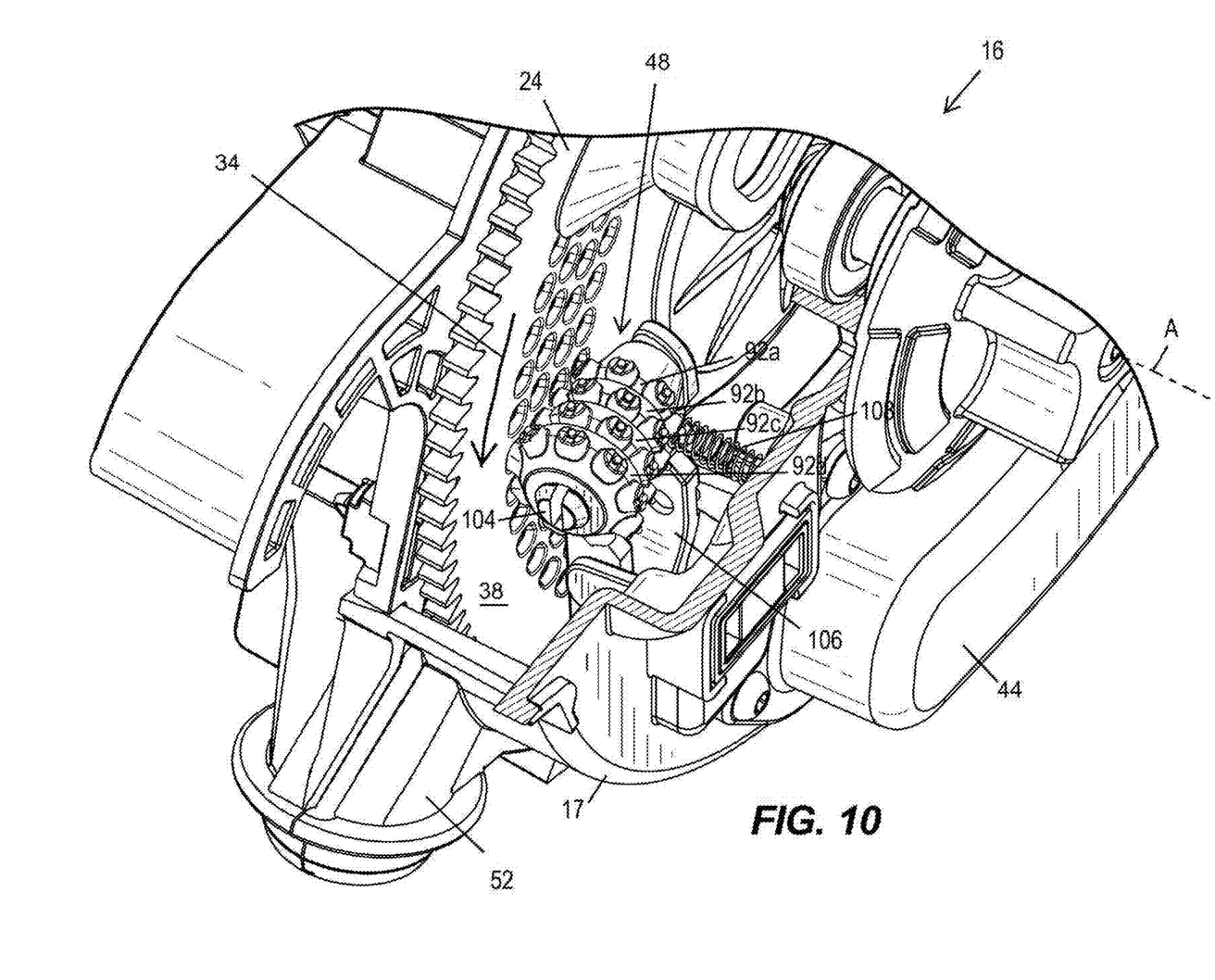
FIG. 10 is a right side perspective view of a portion of the seed meter assembly of FIG. 3 having a kickout wheel assembly.
Figure 11:
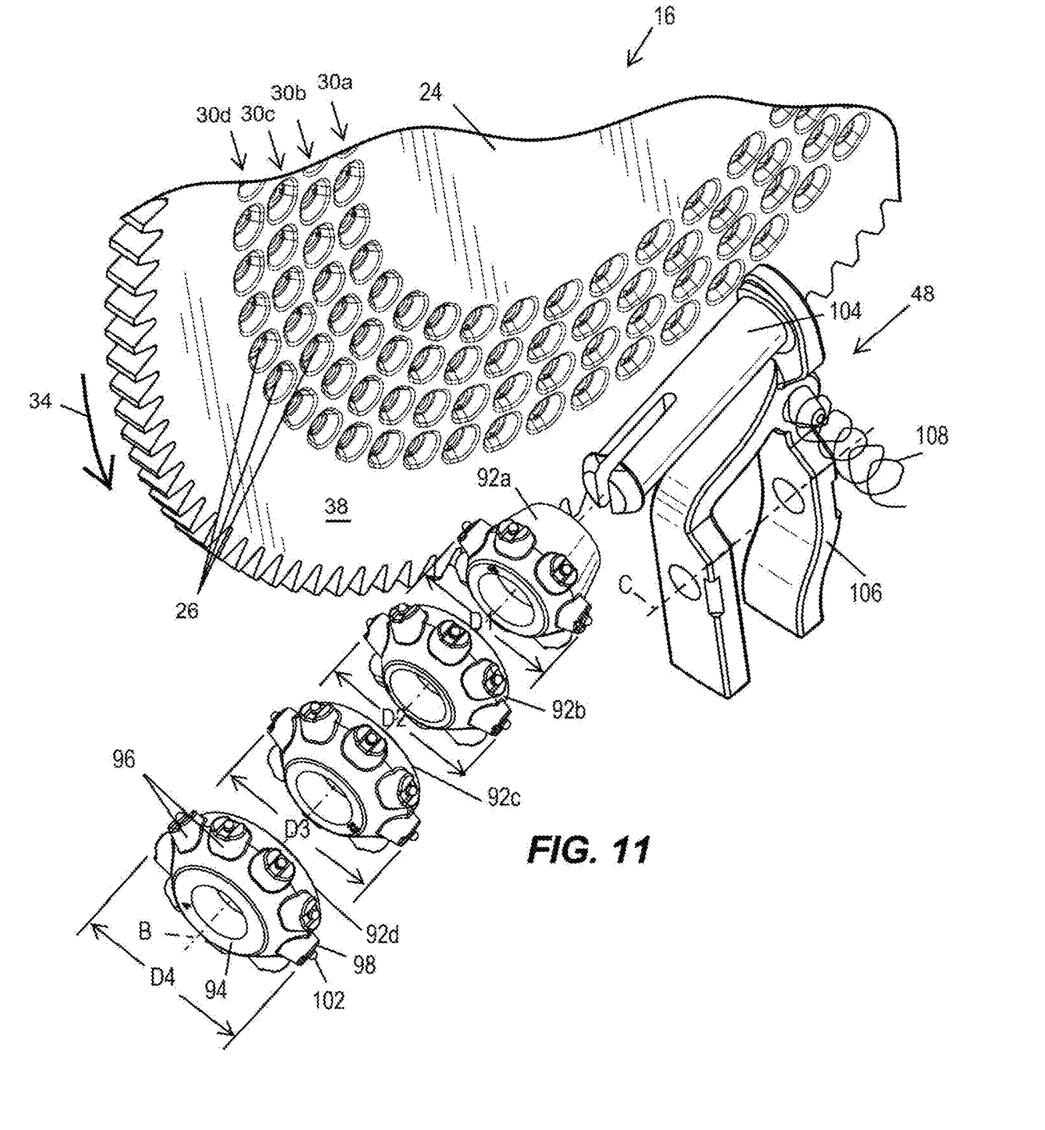
FIG. 11 is an exploded view of the kickout wheel assembly of FIG. 10.

FIGS. 10-11 illustrate the kickout wheel assembly 48, which is disposed on the non-seed side 40 of the metering member 24. The kickout wheel assembly 48 includes a plurality of kickout wheels 92a-92d corresponding to the number of rows of apertures 26. As such, the illustrated implementation includes four rows of apertures 26 and four kickout wheels 92a-92d including a first kickout wheel 92a, a second kickout wheel 92b, a third kickout wheel 92c, and a fourth kickout wheel 92d. Each kickout wheel 92a-92d includes an annular hub 94 and a plurality of projections 96 extending radially from the hub 94. The hub 94 may include a bearing, such as a ball bearing, a needle bearing, a bushing, or any other suitable bearing. The projections 96 each include a shoulder 98 and a tip 102, the tip 102 projecting from the shoulder 98 in a radial direction with respect to the annular hub 94 (i.e., with respect to a bearing axis B which will be described in greater detail). In other implementations, the plurality of projections 96 may have different shapes and configurations. Each projection 96 is configured to extend at least partially into the respective aperture 26. In some implementations the projection 96 may extend through the respective aperture 26. The projections 96 encourage clearing seed remnants out of the apertures 26 after, or concurrently with, the transfer of seeds S from the metering member 24 to the delivery conduit 52 so the metering member 24 is clear for the next revolution. More specifically, the shoulders 98 mesh with the metering member 24 to drive the respective kickout wheel 92a-92d, wherein the tips 102 clear the apertures 26.

Each wheel of the plurality of kickout wheels 92a-92d includes a different diameter D and a different number of projections 96. Specifically, the diameter D1-D4 of the kickout wheels 92a-92d increases from the first to the fourth kickout wheel 92a-92d as the kickout wheels extend radially away from the metering axis A. Similarly, the number of projections 96 increases from the first to the fourth kickout wheel 92a-92d as the kickout wheels extend radially away from the metering axis A. This configuration allows the plurality of kickout wheels 92a-92d to be arranged coaxially about the bearing axis B for independent rotation thereabout while each kickout wheel 92a-92d engages the respective row 30a-30d, each having a different number of apertures 26. That is, each kickout wheel 92a-92d is independently journaled from the next about the common bearing axis B such that each kickout wheel 92a-92d can rotate at a different speed (e.g., revolutions per minute) to mesh with its respective row of apertures 30a-30d.

The plurality of kickout wheels 92a-92d are journaled on an axle 104 defining the bearing axis B. The axle 104 is configured as an elongated pin or rod extending along the bearing axis B from a pivotably mounted yoke 106. The yoke 106 is pivotably mounted about a yoke axis C and biased by a biasing member 108 such that the kickout wheels 92a-92d are biased into engagement with the non-seed side 38 of the metering member 24. The biasing member 108 is disposed between the yoke 106 and the housing 17 and engages the yoke 106 and the housing 17. The biasing member 108 engages the yoke 106 on a side of the yoke axis C on which the axle 104 is disposed so as to bias the axle 104 towards the metering member 24. In the illustrated implementation, the biasing member 108 includes a spring, such as a coil spring. However, in other implementations, the biasing member 108 may include other suitable forms, such as a torsion spring, a leaf spring, an elastic member, etc.

In operation, the metering member 24 rotates about the metering axis A at a relatively high speed through the seed pool 22 as the rows 30a-30d of apertures 26 pick up seeds S from the seed pool by virtue of the pressure differential. The brushes 56a-56d singulate the seeds S as the metering member 24 rotates and are disposed above the seed pool 22, causing excess seeds (in excess of one per aperture 26) to fall back down into the seed pool 22. The shape of the cells 74 facilitates scooping of seeds S from the seed pool 22 and facilitates adherence of one seed S per aperture 26 in cooperation with the plurality of brushes 56a-56d. Employing the plurality of rows 30a-30d of apertures 26 increases the rate of seeds (seeds per second) that are delivered to the furrow 15 relative to metering member 24 diameter. Employing a different number of apertures 26 in each of the plurality of rows 30a-30d allows for more apertures 26 to be disposed on a single metering member 24 (compared with metering members that employ the same number of apertures in each row), which may be referred to as improved aperture density. In order to clear rows 30a-30d of apertures 26 having different numbers of apertures 26, the kickout wheel assembly 48 includes independently journaled kickout wheels 92a-92d each independently rotatable and having a different number of projections 96.

Thus, the disclosure provides, among other things, a seed meter assembly 16 having a multi-row metering member 24 for small seed applications in which a high rate of seed output is desired. The plurality or rows 30a-30d, aperture 26 density, cell 74 geometry, plurality of brushes 56a-56d, and kickout wheel assembly 48 facilitate operation at high speeds and the high rate of seed output. Various features and advantages of the disclosure are set forth in the following claims.

What is claimed is:

1. A kickout wheel assembly for a seed meter having a metering member, the metering member including a first circumferential array of apertures for picking up seeds from a seed reservoir under the influence of a pressure differential, and a second circumferential array of apertures for picking up seeds from the seed reservoir under the influence of the pressure differential, the metering member being rotatable about a rotation axis at a metering member speed, the first circumferential array of apertures being disposed at a first radial distance from the rotation axis and the second circumferential array of apertures being disposed at a second radial distance from the rotation axis, the second radial distance being different than the first radial distance, the kickout wheel assembly comprising:
 a first kickout wheel configured to remove seeds from the first circumferential array of apertures, wherein the first kickout wheel is configured to be driven by the metering member at a first kickout wheel rotational speed that is proportional to the metering member speed; and
 a second kickout wheel configured to remove seeds from the second circumferential array of apertures, wherein the second kickout wheel is configured to be driven by the metering member at a second kickout wheel rotational speed that is proportional to the metering member speed, wherein the second kickout wheel rotational speed is different than the first kickout wheel rotational speed.

2. The kickout wheel assembly of claim 1, wherein the first kickout wheel includes a first set of projections, and the second kickout wheel includes a second set of projections, wherein the first kickout wheel includes a different number of projections than the second kickout wheel.

3. The kickout wheel assembly of claim 1, wherein the second kickout wheel rotational speed is greater than the first kickout wheel rotational speed.

4. The kickout wheel assembly of claim 1, wherein the first kickout wheel has a diameter and the second kickout wheel has another diameter, the diameter of the second kickout wheel being greater than the diameter of the first kickout wheel.

5. The kickout wheel assembly of claim 1, wherein the first kickout wheel and the second kickout wheel are coaxial.

6. The kickout wheel assembly of claim 1, wherein the first kickout wheel and the second kickout wheel are commonly journaled on an axle defining a bearing axis, wherein the axle is mounted on a yoke, wherein the yoke is pivotable about a yoke axis that is different from the bearing axis.

7. A kickout wheel assembly for a seed meter having a metering member including a first circumferential array of apertures for picking up seeds from a seed reservoir under the influence of a pressure differential, and a second circumferential array of apertures for picking up seeds from the seed reservoir under the influence of the pressure differential, the kickout wheel assembly comprising:
 a first kickout wheel configured to remove seeds from the first circumferential array of apertures, wherein the first kickout wheel is journaled for rotation; and
 a second kickout wheel configured to remove seeds from the second circumferential array of apertures, wherein the second kickout wheel is journaled for rotation independently from the first kickout wheel.

8. The kickout wheel assembly of claim 7, wherein the first kickout wheel includes a set of projections, and the second kickout wheel includes another set of projections.

9. The kickout wheel assembly of claim 8, wherein the first kickout wheel has a different number of projections than the second kickout wheel.

10. The kickout wheel assembly of claim 8, wherein the first kickout wheel is configured to be disposed at a first radial distance from a rotation axis of the metering member, wherein the second kickout wheel is configured to be disposed at a second radial distance from the rotation axis, wherein the second radial distance is greater than the first radial distance, and wherein the second kickout wheel includes more projections than the first kickout wheel.

11. The kickout wheel assembly of claim 7, wherein the first and second kickout wheels are configured to be driven simultaneously by the metering member such that the first kickout wheel is configured to be driven at a first rotational speed by the metering member and the second kickout wheel is configured to be driven at a second rotational speed by the metering member, wherein the first rotational speed is different from the second rotational speed.

12. The kickout wheel assembly of claim 7, wherein the first kickout wheel has a diameter and the second kickout wheel has another diameter, the diameter of the second kickout wheel being different from the diameter of the first kickout wheel.

13. The kickout wheel assembly of claim 7, wherein each of the first and second kickout wheels has projections configured to remove the seeds, wherein each of the first and second kickout wheels has a different number of projections relative to the other and a different diameter relative to the other.

14. The kickout wheel assembly of claim 7, wherein the first and second kickout wheels are coaxial.

15. A kickout wheel assembly for removing seeds from a seed metering member, the kickout wheel assembly comprising:
 a first kickout wheel configured to rotate to remove seeds from the seed metering member; and
 a second kickout wheel configured to rotate to remove seeds from the seed metering member, wherein the second kickout wheel is journaled independently from the first kickout wheel.

16. The kickout wheel assembly of claim 15, wherein the first kickout wheel includes a set of projections configured to remove seeds from the seed metering member, and the second kickout wheel includes another set of projections configured to remove seeds from the seed metering member.

17. The kickout wheel assembly of claim 16, wherein the first kickout wheel has a different number of projections than the second kickout wheel.

18. The kickout wheel assembly of claim 15, wherein the first kickout wheel has a diameter and the second kickout wheel has another diameter, the diameter of the second kickout wheel being different from the diameter of the first kickout wheel.

19. The kickout wheel assembly of claim 15, further comprising an axle defining a bearing axis, wherein the first and second kickout wheels are each configured to rotate about the bearing axis.

20. The kickout wheel assembly of claim 19, further comprising a yoke, wherein the first and second kickout wheels are commonly journaled on the axle, wherein the axle is mounted on the yoke, and wherein the yoke is pivotable about a yoke axis that is different from the bearing axis.

* * * * *